R. J. GARDNER.
CAR WHEEL.
APPLICATION FILED MAR. 16, 1908.
932,605.
Patented Aug. 31, 1909.
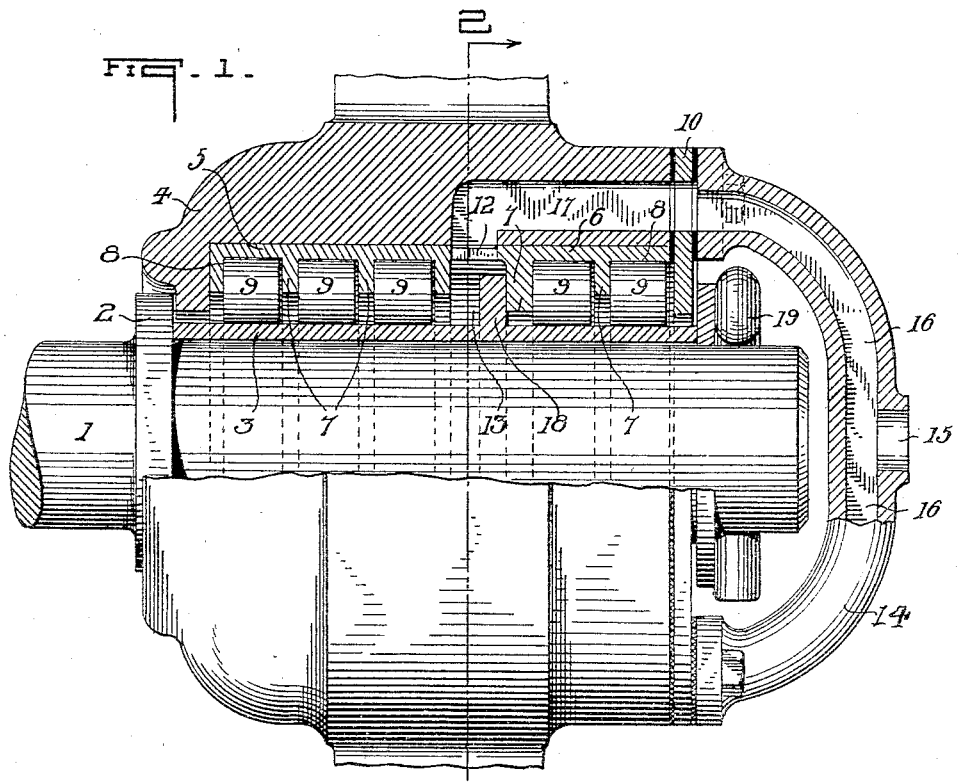
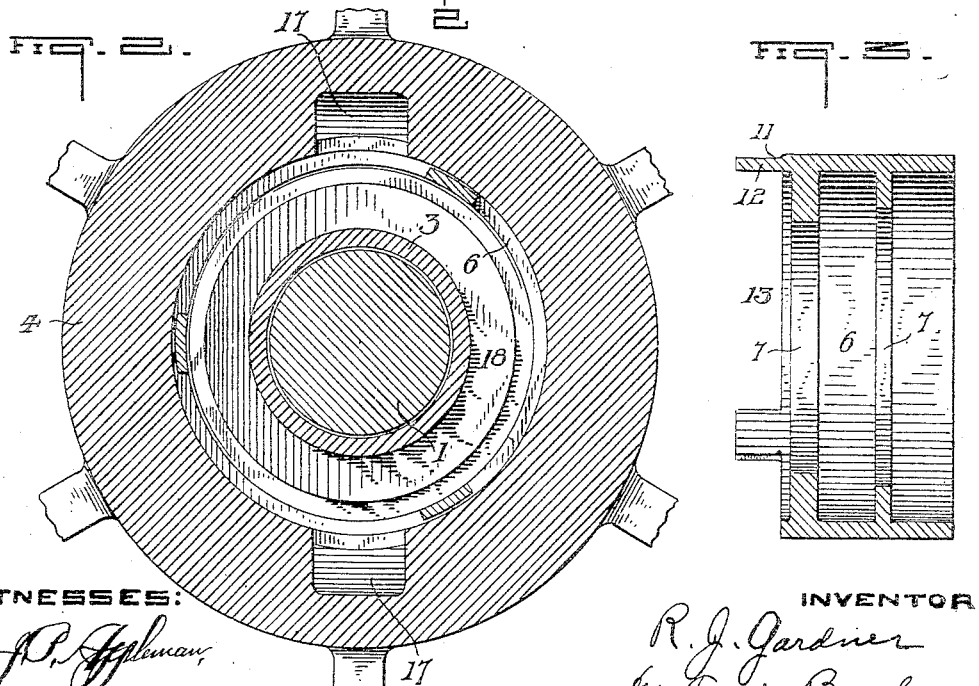
WITNESSES:
INVENTOR
R. J. Gardner
by F. M. Barber
ATTORNEY

UNITED STATES PATENT OFFICE.

ROBERT J. GARDNER, OF PITTSBURG, PENNSYLVANIA, ASSIGNOR TO S. JARVIS ADAMS COMPANY, OF PITTSBURG, PENNSYLVANIA, A CORPORATION OF PENNSYLVANIA.

CAR-WHEEL.

932,605.  Specification of Letters Patent.  Patented Aug. 31, 1909.

Application filed March 16, 1908. Serial No. 421,494.

*To all whom it may concern:*

Be it known that I, ROBERT J. GARDNER, a citizen of the United States, residing at Pittsburg, in the county of Allegheny and State of Pennsylvania, have invented or discovered new and useful Improvements in Car-Wheels, of which the following is a specification.

My invention relates to car-wheels and its object is to provide an improved wheel of this class which shall be composed of but few parts and can be lubricated thoroughly and economically.

It is also an object of my invention to form the races for anti-friction devices in one or more integral groups, whereby they can be readily and cheaply made and will have a maximum of strength for the amount of material used.

Referring to the drawing accompanying this specification, Figure 1 is a central longitudinal section (partly broken away) through a hub containing one form of my invention; Fig. 2, a section of Fig. 1 on the line 2—2; and Fig. 3, a portion of the sleeve 6 in section to show the notched or toothed inner end.

On Figs. 1 and 2, 1 represents an axle having fixed thereon the collar 2, forming an inner lateral thrust bearing for the inner end of the sleeve 3 on the axle. The hub 4 contains the sleeves or cylinders 5 and 6, each having a series of annular ribs 7 projecting radially from its interior and surrounding the said sleeve 3. The annular spaces 8 between consecutive ribs and between the ends of the hub and the terminal ribs 7 constitute races which contain a series of anti-friction rollers 9. The annular face plate 10 covers the outer end of the hub around the axle and by engagement with the outer end of the sleeve 6 and the outer roller 9 confines the sleeves 5 and 6 and the rollers 9 within the hub. The sleeve 5 preferably has an unbroken outer end, against which abut the ends of the projections 12 on the outer end of the sleeve 6. I have shown the sleeve 6 provided with only three projections 12 spaced 120° apart, but any desired number of projections may be used. For a purpose hereinafter stated, I prefer that the projections shall be arranged so that there shall not be two of them diametrically opposite.

It is readily seen that, inasmuch as I machine the outer surface of the sleeve 6, it would be rather difficult to machine the outer face of the projections 12, because the cutter would be liable to jump and the projections might bend or break. In order to avoid the necessity of machining the projections, I cast the sleeve 6 with the depressions 11 on the outer faces of the teeth, the depressions preferably being so deep that after the outer surface of the sleeve has been machined, the depressions 11 will not be entirely removed. In case the sleeve 6 shall be rotated in the hub, the unmachined outer faces of the projections 12 will not be in engagement with the hub.

The spaces between consecutive projections 12 are designated by the numeral 13.

14 is a hollow lubricating device, preferably like that shown in United States Patent, No. 875,340, granted Dec. 31, 1907, to W. C. Fownes, Jr., and Robert J. Gardner. From the inlet 15 in said device 14, the oil passes along the hollow arms 16 and thence through the diametrically opposite passages 17 in the hub and such of the spaces 13 as stand opposite the said passages 17. In case one of the projections 12 should stand opposite one of the passages 17, the opposite passage 17 would not be in the least blocked, since the projections are not arranged diametrically opposite. The reduction of the thickness of the projections by the formation of the depressions 11 permits more lubricant to pass when a projection stands opposite one of the passages 17 than could pass if the projections had their outer faces flush with the sleeve. The sleeve 3 has preferably cast thereon the outwardly extending rib or thrust-ring 18 which bears against the inner face of the inner rib or thrust-ring 7, on the sleeve 6 to limit the inner movement of the hub 4. The friction of the thrust-ring on the said rib 7 might cause a rotation of the sleeve 6. In such a case, the surface of the sleeve would close the passages 17, if the sleeve had but two diametrically opposite holes registering with the said passage. By providing the projections 12 and the spaces 13, no amount of rotation of the sleeve 6 can stop the flow of lubricant from the passages 17 or materially decrease its flow. A linch-pin 19 extends through the axle in front of the hub to limit the outward movement of the wheel on the axle.

Preferably, I make the race-units or sleeves 5 and 6 of cast-steel. I find it advantageous to cast several race rings into one unit instead of forming the rings separately and then assembling them into units at opposite sides of the thrust-ring 18. Where the races are made of assembled L-shaped rings, the endwise thrusts of the hub tend to tilt the rings and cause them to wear and become loose. By casting or otherwise forming several race-rings in a single unit the race-rings are greatly strengthened at the junctions of the sleeves with the ribs 7 and there is no liability of the ribs 7 tilting, or of any wear or looseness appearing between the race-rings.

I do not limit myself to any specific number of race-ring units. I prefer to use the two units 5 and 6 with the form of my invention shown on Figs. 1, 2, and 3, but the number may be greater or smaller.

I claim—

1. In a wheel, a hub, spaced concentric sleeves in the hub, anti-friction devices between the sleeves, the outer sleeve being composed of integral sections each having a plurality of races, and means for spacing apart the inner ends of said sections, said hub being provided with a lubricant passage leading to the said space between the sections.

2. In a wheel, a hub, spaced concentric sleeves in the hub, anti-friction devices between the sleeves, the outer sleeve composed of sections, one of the sections having spaced projections abutting the other section, said hub being provided with lubricant passages leading to one or more spaces between said projections.

3. In a wheel, a hub, spaced concentric sleeves in the hub, anti-friction devices between the sleeves, the outer sleeve composed of sections, one of the sections having spaced projections abutting the other section and having their outer faces depressed below the surface of the section to which they are attached, said hub being provided with lubricating passages leading to one or more of the spaces between said projections.

4. In a wheel, a hub, spaced concentric sleeves in the hub, anti-friction devices between the sleeves, the outer sleeve composed of sections, one of the sections having spaced projections abutting the other section, said hub being provided with lubricant passages leading to one or more spaces between said projections, and said projections being arranged so that they will not stand opposite all of said passages.

Signed at Pittsburg, Pa., this tenth day of March, 1908.

R. J. GARDNER.

Witnesses:
SUZANNE S. BEATTY,
ELVA STANICH.